United States Patent
Ebert et al.

(10) Patent No.: US 10,598,052 B2
(45) Date of Patent: Mar. 24, 2020

(54) BALANCED-PRESSURE MULTI-COMPARTMENT VESSEL, THERMODYNAMIC ENERGY CONVERTER AND OPERATING METHOD

(71) Applicant: Thermolectric Industrial Solutions GmbH, Dresden (DE)

(72) Inventors: Christoph Ebert, Dresden (DE); Alexander Loos, Freital (DE)

(73) Assignee: Thermoelectric Industrial Solutions GmbH, Dresden (DE)

( * ) Notice: Subject to any disclaimer, the term of this patent is extended or adjusted under 35 U.S.C. 154(b) by 0 days.

(21) Appl. No.: 16/062,629

(22) PCT Filed: Dec. 19, 2016

(86) PCT No.: PCT/DE2016/100595
§ 371 (c)(1),
(2) Date: Jun. 15, 2018

(87) PCT Pub. No.: WO2017/101914
PCT Pub. Date: Jun. 22, 2017

(65) Prior Publication Data
US 2018/0371959 A1     Dec. 27, 2018

(30) Foreign Application Priority Data
Dec. 17, 2015   (DE) .................. 10 2015 016 348

(51) Int. Cl.
*F01K 27/00*     (2006.01)
*F01K 3/12*      (2006.01)
(Continued)

(52) U.S. Cl.
CPC .............. *F01K 27/005* (2013.01); *F01K 3/12* (2013.01); *F01K 13/02* (2013.01); *F02G 1/043* (2013.01); *F03G 7/06* (2013.01)

(58) Field of Classification Search
CPC .......... F01K 27/005; F01K 3/12; F01K 13/02; F02G 1/043
See application file for complete search history.

(56) References Cited

U.S. PATENT DOCUMENTS 3,767,325 A * 10/1973 Schuman .............. F02G 1/0435
                                                        417/207
3,830,065 A *  8/1974 McAlister ............... F01K 27/00
                                                         60/670

(Continued)

FOREIGN PATENT DOCUMENTS

AT              506796 A4    12/2009
DE       102010005232 A1     9/2011

*Primary Examiner* — Mark A Laurenzi
*Assistant Examiner* — Shafiq Mian
(74) *Attorney, Agent, or Firm* — Michael Soderman

(57) ABSTRACT

The invention relates to a thermodynamic energy converter (1) with at least one first and one second volume element (10a, 10b) for enclosing a working medium (102) inside a variable inner volume, including a wall that divides the inner volume into heat exchanger compartments (110, 120) and a working compartment (200), wherein a partition (230) is formed inside the working compartment (200) which divides the working compartment (200) into a working chamber (210) supplied with the working medium (201) and a force transmission chamber (212) supplied with a displacement fluid (202), the heat exchanger compartments (110, 120) and the working chamber (210) are interconnected such that the working medium (102) inside the volume element (10a, 10b) has the same pressure, and each heat exchanger compartment (110, 120) is connected to the working chamber (210) via an inlet and an outlet that is formed separately from the inlet. According to the invention, a respective inlet or outlet is designed, as a connection between the heat exchanger compartments (110, 120) and the working chamber (210), with at least one rotary valve (220) so as to (Continued)

prevent a flow through at least one of the heat exchanger compartments (110, 120) and to support a flow through at least one other heat exchanger compartment (110, 120).

26 Claims, 10 Drawing Sheets

(51) Int. Cl.
*F01K 13/02* (2006.01)
*F02G 1/043* (2006.01)
*F03G 7/06* (2006.01)

(56) References Cited

U.S. PATENT DOCUMENTS

| | | | | |
|---|---|---|---|---|
| 5,579,640 A | * | 12/1996 | Gray, Jr. | B60K 6/12 |
| | | | | 60/413 |
| 2006/0059912 A1 | * | 3/2006 | Romanelli | F01K 25/02 |
| | | | | 60/645 |

* cited by examiner

BALANCED-PRESSURE MULTI-COMPARTMENT VESSEL, THERMODYNAMIC ENERGY CONVERTER AND OPERATING METHOD

CROSS REFERENCE TO RELATED APPLICATIONS

This application is the U.S. national stage of International Application No. PCT/DE2016/100595, filed on 2016 Dec. 19. The international application claims the priority of DE 102015016348.5 filed on 2015 Dec. 17; all applications are incorporated by reference herein in their entirety.

BACKGROUND

The invention relates to a balanced-pressure multi-compartment vessel for a thermodynamic energy converter, the thermodynamic energy converter and a method for operating the thermodynamic energy converter. The energy converter serves to convert thermal energy into mechanical energy and mechanical energy into thermal energy, respectively. In a thermodynamic cycle, a gaseous working medium is heated from the outside through supply of higher-temperature heat energy and cooled from the outside in a cyclical sequence through removal with lower-temperature heat energy. The mechanical energy is generated through expansion work. The initial state is reached after completion of one cycle. A so-called balanced-pressure multi-compartment vessel is a volume element for enclosing a working medium which comprises multiple compartments between which the pressure of the working medium will always balance itself out.

A crucial aspect of a cycle is that after completion of one such cycle the working means assumes the same state it had at the beginning of the cycle. If a gas is used as the working medium, its state is defined by the three state parameters p (pressure), V (volume) and T (temperature). Assuming an ideal gas, the relationship between these parameters is as follows:

$$\frac{p \times V}{T} = const.$$

If one follows this basic principle of thermodynamics and uses it as a basis for constructing a working or thermal engine, all that is required is a component which is capable of selectively keeping constant or changing the state parameters p, V and T individually or in combination. With this component, it is then possible to implement individual changes of the state of a working means (e.g. isochoric, isothermal, isobaric, adiabatic or polytropic change of state) in an optimal manner. As a consequence, it becomes possible to technically implement any desired cycle solely through a sequence of different changes of the state of the working means using this single component.

The cycle may take place in a thermal engine that is equipped with cylinders and pistons and in which the expansion work is converted into mechanical energy via rotary motion of moving mechanical pistons, the connecting rod and the crankshaft. Such a thermal engine is described in U.S. Pat. No. 8,938,942 B2. Said document provides an external-combustion, closed-cycle thermal engine. Said engine includes a gas chamber, a heater and a cooler, which are closed. Flow paths connect the gas chamber and the respective inlet and outlet sides of the heater and the cooler, which can be opened or closed through on-off valves. Further, a means is provided for moving a working gas. The switching of the supply of the working gas between the heater and the cooler occurs through on-off valves. A working device, particularly a cylinder with a piston and a crankshaft drive, is provided which is driven by the contracting and expanding working gas. The volume of the heater or the cooler does not affect the efficiency of the engine, and the engine operates under various conditions.

Such known systems for the conversion of thermal energy into mechanical energy and mechanical energy into thermal energy, respectively, in each case follow a single, fixed cycle. This is disadvantageous in that, in the respective fields of operation, the scope of operation of the design is limited in this respect. However, constrictions are primarily caused by the rigid movement patterns dictated by the crankshaft drive.

Another energy converter for the conversion of thermal energy into mechanical energy is known from EP 2 775 109 A1. The disclosure of this document likewise utilizes the effect that with the aid of a single change of state, work can be gained from a certain amount of gaseous working medium only once. In order to repeat the power gain, the working means needs to be returned to the initial state. A simple reversal of the change of state, assuming complete reversibility, will in both cases just consume the previously gained work. If work is to be gained, the initial state needs to be reached through different ways. In this case, the state changes cyclically, i.e., the working means passes through a cycle. Only then can heat be converted into work constantly. The gaseous working medium is located in a volume that is closed to the outside.

The two pressure vessels, which are partially filled with hydraulic oil as a displacement fluid, are hydraulically coupled to valves via a pipeline network. If expansion work of the working medium in the first pressure vessel causes a cover surface of the displacement fluid to move in one direction, e.g. downward, and the displacement fluid to move from the first to the second pressure vessel, the cover surface of the displacement fluid of the second pressure vessel, which is complementary to the first one, will move in the opposite direction. Integrated in the pipeline network between the two pressure vessels is a force-transforming unit, e.g. a hydraulic motor or a linear drive, through which mechanical energy can be utilized. Due to the two hydraulically connected pressure vessels, two simultaneous cycles take place, although with a stroke-shifted sequence of the changes of state.

The geometrical constriction of the process sequence caused by the movement patterns dictated by the crankshaft drive are overcome here since the force transmission of the expansion work is not effected through the mechanical piston in the cylinder but through a practically incompressible hydraulic liquid such as hydraulic oil. The hydraulic oil at the same time provides for force transmission via a pipeline, e.g. to a hydraulic motor which transforms the mechanical energy into a rotary motion and thus utilizes it.

Due to the design providing for regulation with the aid of the valves and the speed of the tube fans proposed in the prior art, various polytropic compression paths and expansion paths of the working medium are possible. These are limited, however, by their regulation and by the volume of the space in the pressure vessel.

SUMMARY

The invention relates to a thermodynamic energy converter (1) with at least one first and one second volume element (10a, 10b) for enclosing a working medium (102) inside a variable inner volume, including a wall that divides the inner volume into heat exchanger compartments (110, 120) and a working compartment (200), wherein a partition (230) is formed inside the working compartment (200) which divides the working compartment (200) into a working chamber (210) supplied with the working medium (201) and a force transmission chamber (212) supplied with a displacement fluid (202), the heat exchanger compartments (110, 120) and the working chamber (210) are interconnected such that the working medium (102) inside the volume element (10a, 10b) has the same pressure, and each heat exchanger compartment (110, 120) is connected to the working chamber (210) via an inlet and an outlet that is formed separately from the inlet. According to the invention, a respective inlet or outlet is designed, as a connection between the heat exchanger compartments (110, 120) and the working chamber (210), with at least one rotary valve (220) so as to prevent a flow through at least one of the heat exchanger compartments (110, 120) and to support a flow through at least one other heat exchanger compartment (110, 120).

DETAILED DESCRIPTION

The object of the present invention is to increase the performance of the energy converter through a novel method and a novel design of the energy converter and its components.

The object is achieved in particular by a thermodynamic energy converter having as its basic element a volume element for enclosing a working medium inside a volume of variable size, hereinafter referred to as a balanced-pressure multi-compartment vessel, for receiving a gaseous working medium. The balanced-pressure multi-compartment vessel includes a wall that divides the inner volume into heat exchanger compartments and a working compartment, wherein a partition is formed inside the working compartment which divides the working compartment into a working chamber supplied with the working medium and a force transmission chamber supplied with a displacement fluid. The heat exchanger compartments and the working chamber are fluidly interconnected such that the working medium inside the volume element has the same pressure and each heat exchanger compartment is connected to the working chamber via an inlet and an outlet that is formed separately from the inlet.

In the region supplied with the working medium, the working compartment forms a working chamber in which the intended thermodynamic cycle takes place during operation. The working compartment is connected to the high-temperature heat exchanger compartment and the low-temperature heat exchanger compartment via at least one respective controllable working medium passage opening.

According to the invention, a respective inlet or outlet is designed, as a connection between the heat exchanger compartments and the working chamber, with at least one device for influencing the flow of working medium through the heat exchanger compartments such that a flow through at least one of the heat exchanger compartments is prevented and a flow through at least one other heat exchanger compartment is supported.

The fluid flow through the working medium passage openings is thus controlled via the device for influencing the flow of working medium through the heat exchanger compartments, which is also referred to as a closing device. In a preferred design example of the invention, both heat exchanger compartments are connected to their respective working compartment through a common circulation line such that the working medium can circulate between a respective one of the heat exchanger compartments with open working medium passage opening and the working compartment. Separate circulation lines are also comprised in the invention but would involve an increased constructional effort. Exceptions may apply where a particular embodiment requires them.

An example of such an embodiment is a tubular design of the working compartment, in which a hose-like, flexible partition is inserted inside the tube and is connected with its ends to the tube such that a tight seal is created. The force transmission chamber thus forms between the tube and the partition, whereas the working chamber is formed inside the hose-like partition.

The heat exchanger compartments are arranged outside the tubular working compartment and are, for example, formed as separate chambers that offer enough space for accommodating the heat exchanger and extend preferably in the longitudinal direction relative to the tubular working compartment. As an alternative to this, in a particularly space-saving design, a cladding tube is provided for accommodating the heat exchangers. For this purpose, the cladding tube is divided into two shell halves so as to form two separated compartments. To achieve sufficient performance of the heat exchanger, it is preferably designed in the form of multiple heat exchangers with smaller diameters, so that these can be installed so as to extend parallel to one another in the narrow space between the cladding tube and the tubular working compartment.

A connection, which enables passage of the working medium, exists between the working compartment and the heat exchanger compartments at their end faces. A closing device, and optionally also an additional fan, is provided here to enable selective control of the passage of the working medium.

The thermodynamic energy converter is equipped with at least one first and one second balanced-pressure multi-component vessel. In the region of the working compartment in which the displacement fluid is supplied and a force transmission chamber is formed, each balanced-pressure multi-component vessel is connected, via at least one main line for the displacement fluid, to a fluid energy transformer assembly for transformation of kinetic flow energy of the displacement fluid (hereinafter simply referred to as fluid energy) into mechanical energy at different inlets of the fluid energy transformer assembly. In the case of a pressure difference between the first and the second balanced-pressure multi-component vessel, the displacement fluid flows from the force transmission chamber with the higher pressure to the force transmission chamber with the lower pressure via a fluid energy transformer assembly.

According to an advantageous design example of the invention, a rotary valve is provided for controlling the working medium passage openings, which rotary valve reduces the cross-sectional flow area of the working medium passage openings at least far enough to hinder the flow.

The object of the thermodynamic energy converter is to convert available heat energy into kinetic energy or, in the reversed process, kinetic energy into thermal energy (heat or cold). For the conversion into kinetic energy, the heat energy is used to heat a working medium. In a working medium assumed to be an ideal gas, this heating leads to an increase in pressure and/or the volume occupied by the working medium, provided that the mass of the working medium remains constant. A volume change then leads to particle movement and thus to a conversion into kinetic energy.

The thermodynamic energy converter according to the invention is formed of at least two balanced-pressure multi-compartment vessels which are hydraulically interconnected via at least one main line in the region of a force transmission chamber. In the main line, which conducts a displacement fluid, a fluid energy transformer assembly is provided which comprises a fluid energy transformer and a valve assembly. It is also possible to connect three, four or more balanced-pressure multi-compartment vessels to the main line, so that a displacement fluid pressure gradient causes a flow via the fluid energy transformer and the flow energy can be converted into at least one other energy form.

Such a balanced-pressure multi-compartment vessel also serves as a temperature control vessel for controlling the temperature of a working medium. It is constructed as a balanced-pressure multi-compartment vessel with at least three compartments which are open towards one another, so that a change in temperature or volume of the working medium in one compartment will always cause a transport of mass between the compartments but the pressure difference between the compartments will always be zero after the transport of mass.

At least one of the compartments of the vessel, which is designed as a high-temperature heat exchanger compartment, has a high-temperature heat exchanger arranged therein, and at least one second chamber has a low-temperature heat exchanger arranged therein, so that a low-temperature heat exchanger compartment is formed. At least one third compartment is at least partially filled with a displacement fluid. This third compartment is designed as a working compartment. The region filled with working medium, which is also provided inside said compartment, is defined as a working chamber. The working compartment region filled with displacement fluid is defined as a force transmission chamber.

In most situations during operation, the third compartment, i.e., the working compartment, is only partially filled with the displacement fluid. In principle, it is also possible that the upper dead center is reached at a working chamber volume $V_{AR}=0$, in which case only the volume of the heat exchanger compartments will act during expansion. The thermal and thus the mechanical efficiency is then significantly lower than at $V_{AR}>0$.

Each of the compartments designed as high-temperature heat exchanger compartment or as low-temperature heat exchanger compartment has two openings, also referred to as working medium passage openings, into the compartment in which one part is defined as a working chamber, however only one of them, either the high-temperature heat exchanger compartment or the low-temperature heat exchanger compartment, is blocked by a closing device, or its flow resistance is increased, if needed. This process is also referred to as shielding, wherein the closing device does not need to close the opening in a pressure-tight manner in order to be able to maintain pressure differences in the compartments. Accordingly, the connection between the heat exchanger compartments and the working compartment is provided with a closing device which makes it possible to hinder the flow through at least one of the heat exchanger compartments by increasing the flow resistance such that the working medium preferably flows through the other heat exchanger compartment. This may occur through a closing device designed as an aperture, rotary valve or another throttling device. The compartments are thus always open towards one another, but a flow through the compartments occurs only if both openings are open, i.e., not shielded.

In a special case of operation, the flow through both heat exchanger compartments can be hindered by an increase in flow resistance in the opening or openings such that an expansion or compression of the gaseous working medium occurs adiabatically instead of isothermally. In this case, the working medium can be conveyed into or out of the heat exchanger compartments via a circulation line without the gas circulating through the high-temperature heat exchanger compartment or the low-temperature heat exchanger compartment.

In the most frequent case of operation, heat is permanently supplied to the working medium in the high-temperature heat exchanger compartment and is permanently removed from the working medium in the low-temperature heat exchanger compartment. The working medium in the high-temperature heat exchanger compartment is thus permanently heated, i.e., the temperature of the working medium is constantly high, and the working medium in the low-temperature heat exchanger compartment is always cooled, i.e., the temperature of the working medium is constantly low. The working medium in the working chamber in the stationary state has an average temperature corresponding to the ratio between the cooling and heating power in the two other compartments.

The selective flow through one of the heat exchanger compartments and the first working chamber open towards said compartment together with the simultaneous hindering of the flow through the second heat exchanger compartment causes the working medium in the working chamber to reach the temperature of the heat exchanger compartment it flows through due to the significantly higher thermal conduction under forced convection. If the volume remains constant, the pressure in the entire balanced-pressure multi-compartment vessel will decrease upon cooling and increase upon heating. The selective passage is achieved by selectively setting a flow path, for example by blocking or opening the entrances, orifices or working medium passage openings into the working chamber. Further, a flow unit introduced into the flow path, e.g. a fan or a circulation compressor, may provide for passage occurring with an actively forced increase in the volumetric flow rate of the working medium. The method according to the invention may also proceed without a flow unit, although in this case with only very little efficiency since low-density hot gas inflow alone will induce only limited circulation.

In an exemplary initial situation, cold gas is present as a working medium in all three compartments (high-temperature heat exchanger compartment, low-temperature heat exchanger compartment, working chamber) of a balanced-pressure multi-component vessel. Upon activation of the device according to the invention, the gas is heated in the high-temperature heat exchanger compartment. Since it is open towards the other compartments, a portion of the hot gas flows into the low-temperature heat exchanger compartment and the working chamber via the openings. In the low-temperature heat exchanger compartment, the gas is immediately cooled again, and a mixed temperature is reached in the working chamber. When flowing through the working chamber and the high-temperature heat exchanger compartment, the gas therein is heated. In this process, the gas also flows into the low-temperature heat exchanger compartment, since the pressure is always balanced out. However, no gas exits the low-temperature heat exchanger compartment, since no flow can occur through it.

A preferred design of the balanced-pressure multi-compartment vessel provides, in the region of at least one of the working medium passage openings and/or the circulation line, the flow unit for increasing a flow velocity of the working medium between the working compartment and at least one of the compartments of the balanced-pressure multi-compartment vessel. The flow unit, e.g. the circulation compressor or fan, creates a pressure gradient in the flow path, however the pressure always balances itself out in all three compartments.

For the working medium to be able to actively flow through the heat exchanger compartments, the flow unit ideally conveys the working medium from the working chamber to the heat exchanger compartments, through the heat exchanger compartments and back into the working chamber. To achieve adjustment of the convection and the mass flow rate of the working medium, in a preferred embodiment of the balanced-pressure multi-component vessel according to the invention, the volumetric flow rate of the flow unit is controlled, for example, by an rpm-controlled fan. To achieve quick cooling or heating of the working medium inside the working chamber, the heat transport from the working medium into the wall of the balanced-pressure multi-component vessel, or vice versa, needs to be minimized. For this purpose, at least the working compartment, and preferably the entire balanced-pressure multi-compartment vessel, has an insulator, particularly an internal insulator, with very low heat conductivity.

In addition, a partition is preferably arranged on the surface of the displacement fluid, which partition falls and rises with decreasing or increasing displacement fluid level. The partition may be insulated or itself consist of an insulating material or comprise a membrane that is coated with or itself consists of an insulating material. The partition thus serves as an at least thermal separation between the displacement fluid and the working medium and, in the preferred design example, in addition to a reduced heat transfer, can also prevent possible interactions between the two, e.g. vaporization of displacement fluid into the working medium or dissolution of portions of the working medium in the displacement fluid. In a preferred embodiment, the partition is movable. The movable partition is designed such that its buoyancy achieved through the selected material and/or shape of the partition with respect to the displacement fluid is larger than its weight. Due to this, it always remains on the surface of the displacement fluid.

In a particularly advantageous design example of the partition, it includes a thermal insulator or itself consists of an insulating material and prevents disadvantageous heat transfer between the working medium and the displacement fluid.

In other embodiments, the insulator between the working medium and the displacement fluid consists in an elastic partition fixed inside the working chamber or a membrane comprising a movable partition. The elastic partition and the membrane at the same time also form a barrier impermeable to substances between the displacement fluid and the working medium.

The insulation further improves the efficiency of the thermodynamic energy converter according to the invention. In advantageous embodiments, the partition is designed as a disk having an edge that is raised upward orthogonally or conically away from the displacement fluid, as a hollow structure, or as a flattened ellipsoid of revolution. The partition may additionally include a sealing member for closing the gap towards the internal insulator of the vessel. If the partition includes a circumferential seal towards the inner wall of the force transmission chamber, so that the working medium is not in direct contact with the displacement fluid, the function would be similar to that of a piston type accumulator. The partition then corresponds to the piston, and the working compartment with the at least longitudinally movable partition arranged therein corresponds to the cylinder.

The internal insulation of the working compartment and the insulation towards the displacement fluid may also be accomplished by an integral membrane, also referred to as a bladder, particularly if its wall has very low heat conductivity. This embodiment is advantageous in that the membrane additionally separates the working chamber hermetically from the displacement fluid and avoids problems of leak tightness. Through this, dissolution and degassing of the working medium into and out of the displacement fluid, respectively, which occurs particularly in the case of pressure changes, can be prevented even better than it would be possible with the partition.

To achieve better control of the temperatures in the heat exchanger compartments, i.e., control of the heat flow that is necessary in the individual process steps and that is transferred from an external heat or cold source with the working medium via the heat exchangers in the thermodynamic energy converter according to the invention, at least one of the heat exchanger compartments may be designed to be controllable. To achieve this, for example, multiple individually controllable heat exchangers may be arranged in a heat exchanger compartment, or multiple individual compartments may each be formed with high-temperature or low-temperature heat exchangers. The interconnection of these compartments may in turn comprise a throttle function, for example through flaps, apertures or slide valves. Depending on the mode of operation of the system, different heat quantities are necessary for heating, maintaining a particular temperature, and non-isothermal expansion or compression. By means of a throttle function in the sense of the present invention, heat can be stored temporarily outside or inside the compartment system.

Furthermore, it is possible to use displaceable walls, control pistons or a liquid filling the lower portion of a heat exchanger compartment up to a variable level for changing the effective volume in a heat exchanger compartment such that there is always an optimum power ratio between the high-temperature heat exchanger compartment and the low-temperature heat exchanger compartment. The adjustable volumes of the heat exchanger compartments serve to achieve efficient operation of the system since the smaller the volume of the heat exchanger compartments in relation to the volume of the working chamber, the larger the usable power. Therefore, different heat exchanger compartment volumes are necessary depending on the heat or cold quantity needed. Thus, in the balanced-pressure multi-compartment vessel according to the invention, at least one of the heat exchanger compartments has an adjustable operating point in that the volume of the heat exchanger compartment is adjustable. The adjustment can be achieved through a control piston assembly comprising a cylinder element and a control piston, or through control compartments selectable by means of control flaps, or through a liquid control system, wherein a control liquid occupies portions of the volume of the heat exchanger compartment.

Two of those temperature control vessels, which are designed as balanced-pressure multi-compartment vessels, are connected via the fluid energy transformer assembly through a main line in the form of a tube or hose connection or a connection borehole. This connection has at least one integrated fluid energy transformer. This may be, for example, a rotationally acting fluid motor, but also a linear motor or another movable actuator.

The main line also has an integrated valve assembly so that the flow through the fluid energy transformer can be regulated. The fluid energy transformer assembly is then designed such that the main line for the displacement fluid is connected to the fluid energy transformer via a valve assembly, so that the flow direction in the fluid energy transformer is adjustable regardless of the flow direction between the working compartment, and/or the flow volume of the displacement fluid is controlled depending on the pressure and/or the temperature of the working medium in the pressure vessel. Through this, it is possible, for example, to always have the same direction of rotation of a rotating energy converter regardless of the operating phase of the balanced-pressure vessel.

Parallel to this connection via the main line, two or more balanced-pressure multi-compartment vessels may additionally be connected through a bypass line with a valve so as to enable a quick transport of the displacement fluid from the force transmission chamber of one of the balanced-pressure multi-compartment vessels into the force transmission chamber of another one of the balanced-pressure multi-compartment vessels. This is because the power that can be transferred via the main line is only very small in the case of small pressure differences, so that, on the whole, it is more efficient to accelerate the pressure balancing process via the bypass line in order to be able to quickly proceed to the next process step. For this, a bypass line with controllable displacement fluid flow is provided in the energy converter between the first and second working compartments, wherein said bypass line is coupled to each of the working compartments supplied with displacement fluid in the region of the force transmission chamber.

Particularly great advantages are obtained in the case of a balanced-pressure multi-compartment vessel which has a wall channel in which a regenerator is provided which comprises a heat-storing fill mass and which can absorb heat in a first passage direction and give off heat in a second passage direction. The passage direction can be controlled by means of the closing device, which is, for example, designed as a rotary valve, and at least two separate regions of the wall channel. The optional addition of the regenerator to the balanced-pressure multi-compartment vessel further improves the overall efficiency. The regenerator is a heat exchanger having the fill mass serving as short-term heat storage, also referred to as thermal mass, which is alternately flown through by the hot and cold working media. Heat is first transferred from the working medium to the heat storage and is subsequently given off to the subsequently passing working medium in the following stroke. If, for example, working medium also flows into the low-temperature heat exchanger compartment during heating, the heat can be given off to the thermal mass of the regenerator in advance and can be stored therein. Thus, the working medium does not need to be cooled completely in the low-temperature heat exchanger compartment but already enters the latter in a precooled state. When working medium exits the low-temperature heat exchanger compartment, the heat stored in the regenerator can be transferred to the working medium, so that a portion of the heat required for heating the working medium does not need to be provided by the external heat supply.

According to an advantageous embodiment of the invention, the balanced-pressure multi-compartment vessel is equipped with a rotary valve, which also controls the circulation line if the latter is arranged as a wall channel in a channel partition wall.

The object is further achieved by a method for operating a thermodynamic energy converter as described before. In said method, a. in a first mode, heat is transferred to the working medium in the high-temperature heat exchanger compartment of a first balanced-pressure multi-compartment vessel via the high-temperature heat exchanger, and the working medium is also expanded in the working compartment of the first balanced-pressure multi-compartment vessel, and/or heat is removed in the low-temperature heat exchanger compartment of a second balanced-pressure multi-compartment vessel via the low-temperature heat exchanger, and the working medium is also contracted in the working compartment of the second balanced-pressure multi-compartment vessel, wherein, as a result of the pressure difference of the working media inside the balanced-pressure multi-compartment vessels, the displacement fluid is pressed through the main line and the fluid energy transformer assembly from the working compartment of the first balanced-pressure multi-compartment vessel to the working compartment of the second balanced-pressure multi-compartment vessel, and kinetic energy of the displacement fluid is converted into mechanical energy, and b. in a second mode, heat is transferred to the working medium in the high-temperature heat exchanger compartment of the second balanced-pressure multi-compartment vessel via the high-temperature heat exchanger, and the working medium is also expanded in the working compartment of the second balanced-pressure multi-compartment vessel, and/or heat is removed in the low-temperature heat exchanger compartment of the first balanced-pressure multi-compartment vessel via the low-temperature heat exchanger, and the working medium is also contracted in the working compartment of the first balanced-pressure multi-compartment vessel, wherein, as a result of the pressure difference of the working media inside the balanced-pressure multi-compartment vessels, the displacement fluid is pressed through the main line and the fluid energy transformer assembly from the working compartment of the second balanced-pressure multi-compartment vessel to the working compartment of the first balanced-pressure multi-compartment vessel, and kinetic energy of the displacement fluid is converted into mechanical energy.

The thermodynamic energy converter according to the invention described above enables the flexible implementation of various cycles through variation and combination of different thermodynamic changes of state and their sequences in the overall process. For example, isothermal, isobaric, isochoric and adiabatic (isentropic) changes of the state of the working medium in the individual vessels can be implemented through selective control of supply and removal of thermal energy and control of the volume change of the working medium through control of the flow volume in the fluid energy transformer unit. Isothermal, isochoric, isobaric and adiabatic changes of state are achieved in particular by the selected control of the flow through heat exchanger compartments by means of at least one flow unit, e.g. a ventilator, fan or circulation compressor, and closure of individual openings through the closing device in the balanced-pressure multi-compartment vessel, and through the interaction with a second or further balanced-pressure multi-compartment vessel, wherein the force transmission chambers are connected via the hydraulic unit. The hydraulic unit includes especially the main line and the units connected to it (valve assembly, fluid energy transformer assembly), but also the bypass line.

Advantageously, the energy converter described above may comprise at least two pairs or at least two sets of at least one first and one second balanced-pressure multi-compartment vessel together with the fluid energy transformer. These are coupled via the valve assembly in such a manner that a phase-shifted parallel operation of the pairs of working compartments enables a practically continuous supply of displacement fluid to the fluid energy transformer. This enables a continuous energy output.

BRIEF DESCRIPTION OF THE DRAWINGS

Further details, features and advantages of the invention become apparent from the following description of embodiments under reference to the associated drawings. In the schematic drawings.

DETAILED DESCRIPTION OF THE PREFERRED EMBODIMENTS

Figure 1:
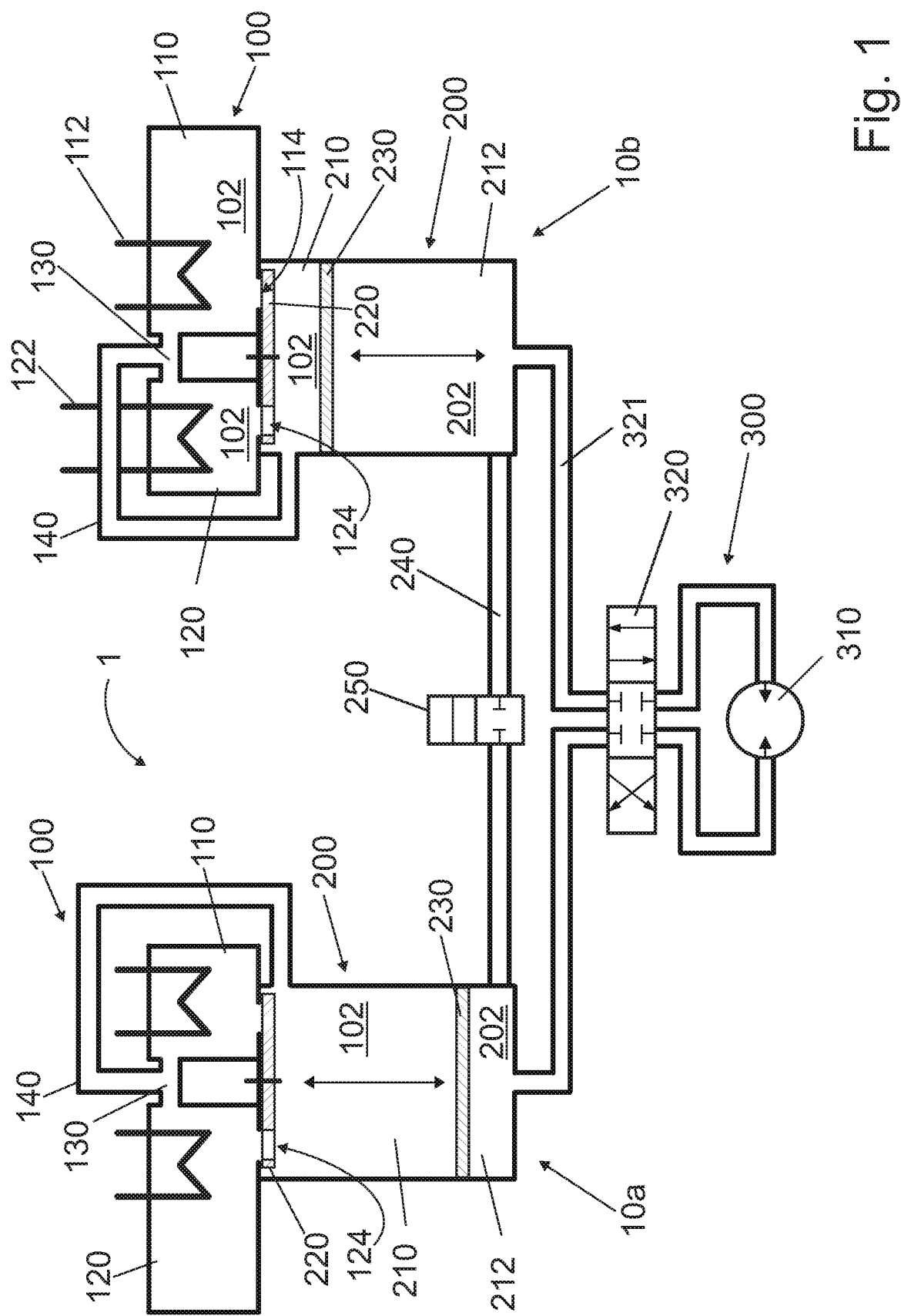
FIG. 1: shows an embodiment of a thermodynamic energy converter according to the invention.

FIG. 1 schematically shows an embodiment of a thermodynamic energy converter 1 according to the invention, comprising two heat exchanger assemblies 100 and two working compartments 200 connected to said heat exchanger assemblies 100, wherein a heat exchanger assembly 100 and a working compartment 200 together form a respective balanced-pressure multi-compartment vessel 10a, 10b. In the energy converter 1 with its working compartments 200, a sequence of different changes of the state of a gaseous working medium 102 takes place in cycles which respectively include alternating compression and expansion inside each working compartment 200. This is made possible through alternated supply of higher-temperature heat energy flows via a high-temperature heat exchanger 122 and removal of lower-temperature heat energy flows via a low-temperature heat exchanger 112. The cooling and also the heating of the working medium preferably occur with the aid of regulated heat exchangers 112 and 122 and actuating drives and/or flow units 142 (cf. FIGS. 7 to 10), such as fans or ventilators.

Two working compartments 200 respectively include upper and lower regions, wherein the lower region is supplied with working medium 102 and is referred to as a working chamber 210, and wherein the lower region formed below the working chamber 210 is supplied with a displacement fluid 202 and is referred to as a force transmission chamber 212. The displacement fluid 202 is a practically incompressible fluid. It thus acts in a fashion similar to that of a piston with a piston rod in mechanical systems and serves for force transmission of the pressure force applied by the working medium 102 and transferred to the displacement fluid 202. The two working compartments 200 are connected at least via a main line 321 with a valve assembly 320 and a fluid energy transformer assembly 300. The valve assembly 320 comprises valves and preferably also actuating and control drives, and the fluid energy transformer assembly 300 comprises at least one fluid energy transformer 310, for example a hydraulic motor. The main line 321 thus serves for the transport of the displacement fluid 202 between the two force transmission chambers 212.

Furthermore, a freely movable, thermally insulating partition 230 is located between the working chamber 210, i.e., the upper region of the working compartments 200, and the force transmission chamber 212 if the latter is supplied with displacement fluid.

An aspect which has shown to be particularly advantageous in the illustrated preferred embodiment of the invention is that the pressure changes that occur at large temperature differences and affect optimal operation are eliminated in the stroke sequence of the changes of state. The pressure changes have a negative effect on, for example, actuating drives for valves or flow units. They are created predominantly by the high frequency of changes of states and, according to the invention, are avoided through a balanced pressure in all compartments, i.e., the heat exchanger compartments 110, 120 and the working compartment 200. This is done through interconnection of the compartments via openings which also allow pressure balancing. The heat exchanger compartments 110, 120 are connected via a compartment bridge 130.

With an additional bypass, i.e., the bypass line 240, and the valve 250 for bypass control between the working compartments 200, the displacement fluid 202 can be transferred from one working compartment 200 to the other in a quick manner, for example to accelerate the operation when only small pressure differences remain between the balanced-pressure multi-compartment vessels 10a, 10b towards the end of an operating phase.

The pair of heat exchanger compartments with the differently sized heat exchanger compartments 110, 120 is connected to the working chamber 210 inside the working compartment 200 via a circulation line 140. To this end, the circulation line 140 preferably opens directly into the heat exchanger compartments 110, 120 (cf. FIG. 8) or, as illustrated here, into a compartment bridge 130 via which the heat exchanger compartments 110, 120 are bridged and connected. The connection of one of the heat exchanger compartments 110, 120 to the working chamber 210, which contains the working medium 102 and extends between a closing device, e.g. a rotary valve 220, and the movable partition 230, can be opened or closed via the rotary valve 220. Through the circulation line 140 and the connection of one of the heat exchanger compartments 110, 120 to the working chamber 210, a circulation is possible which is controllable through opening, shielding or closing of the openings serving as working medium passage openings 114 and 124 by means of the rotary valve 220.

Reference may be made to FIG. 1 also for a description of the method according to the invention. Operation of the energy converter according to the invention is hereinafter illustrated and described using the Stirling cycle as an example. The circulation here occurs via the at least two open connections between the working chamber 210 and one of the heat exchanger compartments 110, 120, of which at least one can be closed or shielded with the closing device 220, for example a rotary valve segment. The circulation here occurs either through the heat exchanger compartment 110 and out of the heat exchanger compartment 110 or through the heat exchanger compartment 120 and out of the heat exchanger compartment 120, in each case particularly via the circulation line 140, which acts as the second open connection and may be designed, for example, as a separate line or simply as a second exit into the working chamber 210, into the working chamber 210.

If the working medium 102 is compressed and at the same time constantly cooled further such that the pressure remains constant, or a gas is expanded and the temperature is increased according to the volume increase, an isobaric process step is achieved.

The gaseous working medium 102 is located in the two connected balanced-pressure multi-compartment vessels 10, which have a same structure. The heat exchangers 122, 112 are in contact with a hot medium on the one hand and a cold medium on the other hand, said media acting as a heat source and a heat sink, respectively. The main line 321 and the bypass line 240 between the two balanced-pressure multi-compartment vessels 10a, 10b in the region of the force transmission chambers 212 are closed.

In the first balanced-pressure multi-compartment vessel 10a, the rotary valve 220 is set such that the connection between the working chamber 210 and the low-temperature heat exchanger compartment 110 is bulkheaded off and the working medium 102 preferably circulates through the high-temperature heat exchanger compartment 120 and the working chamber 210. The working medium 102 is thus heated and the pressure in the entire vessel volume of the balanced-pressure multi-compartment vessel 10a increases.

The bulkheading by means of the closing device, for example by means of a rotary valve segment of the rotary valve 220, is not intended as a complete closure, which is why the closing in this manner is also referred to as "shielding". The segment is moved to a position in front of the opening forming the working medium passage opening 114, 124, but this does not constitute a gastight closure. It only increases the flow resistance such that the gaseous working medium 102 flows through a flow path having a lower flow resistance and preferably circulates through the described path. This results in a special advantage of the present invention over the use of known valves, compartments closed with those valves and resulting pressure differences. These valves would be very complex and expensive. The invention therefore dispenses with such elements and merely increases the flow resistance through significant reduction of the passable cross-section.

Parallel to the settings in the first balanced-pressure multi-compartment vessel 10a, in the second balanced-pressure multi-compartment vessel 10b, the closing device 220 is set such that the connection between the working chamber 210 and the high-temperature heat exchanger compartment 120 is bulkheaded off and the working medium 102 preferably circulates through the low-temperature heat exchanger compartment 110 and the working chamber 210. The working medium 102 in the second balanced-pressure multi-compartment vessel 10b is thereby cooled and the pressure in the entire vessel volume of the second balanced-pressure multi-compartment vessel 10b decreases.

Thus, a pressure difference, and therefore a potential to perform work, has developed between the two balanced-pressure multi-compartment vessels 10a, 10b.

In a subsequent second process step, the main line 321 for the displacement fluid 202, which connects the force transmission chamber 212 of the first balanced-pressure multi-compartment vessel 10a to the force transmission chamber 212 of the second balanced-pressure multi-compartment vessel 10b, is opened through the valve assembly 320. The working medium 102 in the first balanced-pressure multi-compartment vessel 10a expands, while the working medium 102 in the second balanced-pressure multi-compartment vessel 10b is compressed. In this situation, the displacement fluid 202 is pushed out of the force transmission chamber 212 of the first balanced-pressure multi-compartment vessel 10a and into the force transmission chamber 212 of the second balanced-pressure multi-compartment vessel 10b while flowing through the fluid energy transformer 310, which performs work. During this process, the pressures in the two balanced-pressure multi-compartment vessels 10a, 10b more and more balance each other out. The movement, i.e., the flow of the displacement fluid 202, comes to a halt once the pressure balance is reached.

If the closing device 220 remains in the same position as in process step 1 and the working medium 102 continues to be circulated, the expansion and the compression occur nearly or completely isothermally. If the connections to all respective heat exchanger compartments 110, 120 are shut off by means of the closing device 220, the expansion and the compression occur adiabatically.

To accelerate the pressure balancing in the balanced-pressure multi-compartment vessels 10a, 10b, in a third optional process step, the main line 321 may be closed and the bypass line 240 may be opened in order to achieve a quick transfer of the displacement fluid 202 from the first balanced-pressure multi-compartment vessel 10 to the second balanced-pressure multi-compartment vessel 10b and thus establishment of the pressure balance. At the end of process step 3, the bypass line 240 is closed again.

In a fourth process step, the closing device 220 in the first balanced-pressure multi-compartment vessel 10a is moved into the position in which the connection to the low-temperature heat exchanger compartment 110 is opened and the connection to the high-temperature heat exchanger compartment 120 is closed. The working medium 102 thus circulates through the low-temperature heat exchanger 110 and the working chamber 210 of the first balanced-pressure multi-compartment vessel 10a.

The working medium 102 in the working chamber 210 is thereby cooled and the pressure in the entire first balanced-pressure multi-compartment vessel 10a decreases. In the second balanced-pressure multi-compartment vessel 10b, the closing device 220 is moved such that the connection to the high-temperature heat exchanger compartment 120 is opened and the connection to the low-temperature heat exchanger compartment 110 is closed. The working medium 102 in the second balanced-pressure multi-compartment vessel 10b now circulates through the working chamber 210 and the high-temperature heat exchanger compartment 120. The temperature and the pressure of the working medium 102 in the second balanced-pressure multi-compartment vessel 10b increase.

In the subsequent fifth process step, the main line 321 is opened again and the working medium 102 in the second balanced-pressure multi-compartment vessel 10b is expanded while the working medium 102 in the first balanced-pressure multi-compartment vessel 10a is compressed. In this situation, the displacement fluid 202 flows from the force transmission chamber 212 of the second balanced-pressure multi-compartment vessel 10b via the fluid energy transformer 310 into the force transmission chamber 212 of the first balanced-pressure multi-compartment vessel 10a until a same pressure is reached in the two balanced-pressure multi-compartment vessel 10a, 10b or the main line 321 is closed. If the rotary valve segments of the closing devices 220 remain in the position of process step 4, the expansion and the compression again proceed isothermally, and if the connections between the chambers 110, 120, 210 are shut off, the expansion and the compression proceed adiabatically. The process step 5 is the actual reverse power stroke.

In a sixth process step, the bypass line 240 can be opened again to achieve quick pressure balancing between the two balanced-pressure multi-compartment vessels 10a, 10b. After these six process steps, the initial state is reached again and the process starts again at process step 1. The method according to the invention comprises a total of six process steps, including the two optional bypass steps.

The heating or cooling of the gas at a constant volume (which concerns the process steps 1 and 3 described above) in the balanced-pressure multi-compartment vessel 10a, 10b constitutes an isochoric change of state.

If the working medium 102 is compressed and at the same time constantly cooled further such that the pressure remains constant, or a gas is expanded and the temperature is increased according to the volume increase, an isobaric process step occurs. The following relationship always applies:

$$\frac{p \times V}{T} = const.$$

and, depending on whether heat is supplied or removed and a volume change occurs, a balanced-pressure multi-compartment vessel 10a, 10b (i.e., through interaction with a second balanced-pressure multi-compartment vessel) enables the implementation of any desired change of the state of the working medium 102.

However, process step 2 also provides for the possibility of an adiabatic expansion or compression. If the closing device 220 shuts off both connections of the working compartment 210 to the heat exchanger compartments 110, 120, the energy converter is not operated in the Stirling cycle but in the Otto cycle.

Cycles in which the number of strokes does not equal four, such as the Seilinger process with five strokes or the Atkinson process with six strokes, are also possible if the expansion and compression strokes are opposed and the amount of the volume change is equal. Furthermore, the expansion can take place only if the compression stroke, which is shifted by 180°, has a lower pressure.

If the direction of possible cycles is reversed (counter-clockwise cycles), mechanical energy is converted into thermal energy. The energy converter according to the invention, which is also referred to as a hydropneumatic energy converter, thus acts as a refrigerator or as a heat pump.

An isothermal process with expansion or compression at a temperature which is kept constant through reheating or cooling, an isochoric process in which no expansion work is performed, and an adiabatic process with expansion or compression with simultaneous change in pressure and temperature are also possible.

Figure 2:
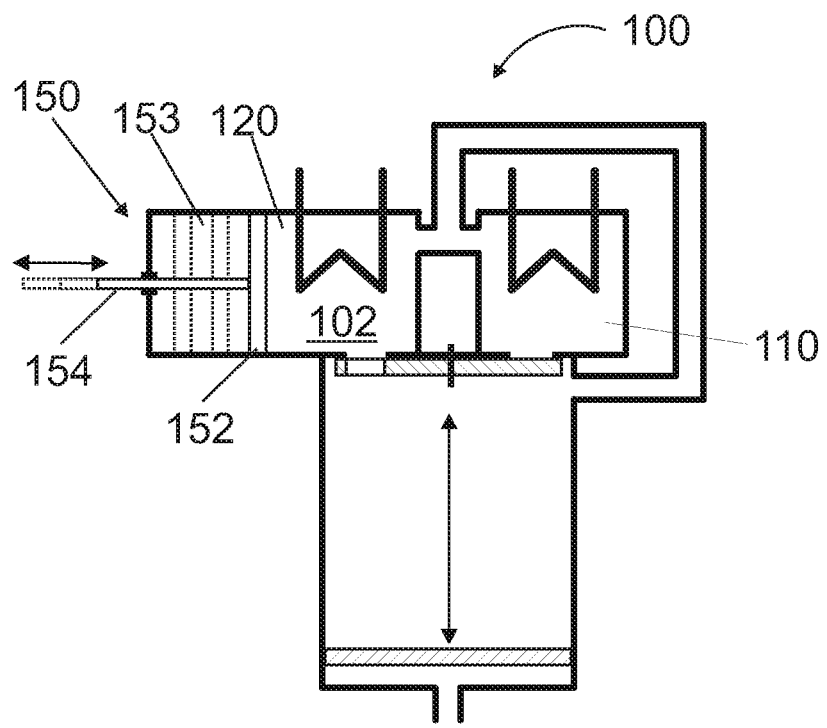
FIG. 2: shows an embodiment of a heat exchanger assembly according to the invention with a heat exchanger compartment of variable size.

FIG. 2 schematically shows another embodiment of a heat exchanger assembly 100 according to the invention. Said figure shows a heat exchanger assembly 100 design in which the size difference between the heat exchanger compartments 110, 120 can be varied such that an adaptation to different temperature differences is possible through adaptation of the volume of the high-temperature heat exchanger compartment 120 of the higher-temperature working medium 102 through presetting with a control piston assembly 150, whereas the volume of the low-temperature heat exchanger compartment 110 cannot be varied. The control piston assembly 150 includes a control piston 152 arranged in a cylinder element 153. The cylinder element 153 comprises a region of the high-temperature heat exchanger compartment 120. The control piston 152 is arranged in this region in a movable manner and includes a piston rod 154 for its operation. The change in volume of the heat exchanger compartments 110, 120 allows improvement of the efficiency of the heat transfer to the working medium 102.

Figure 3:
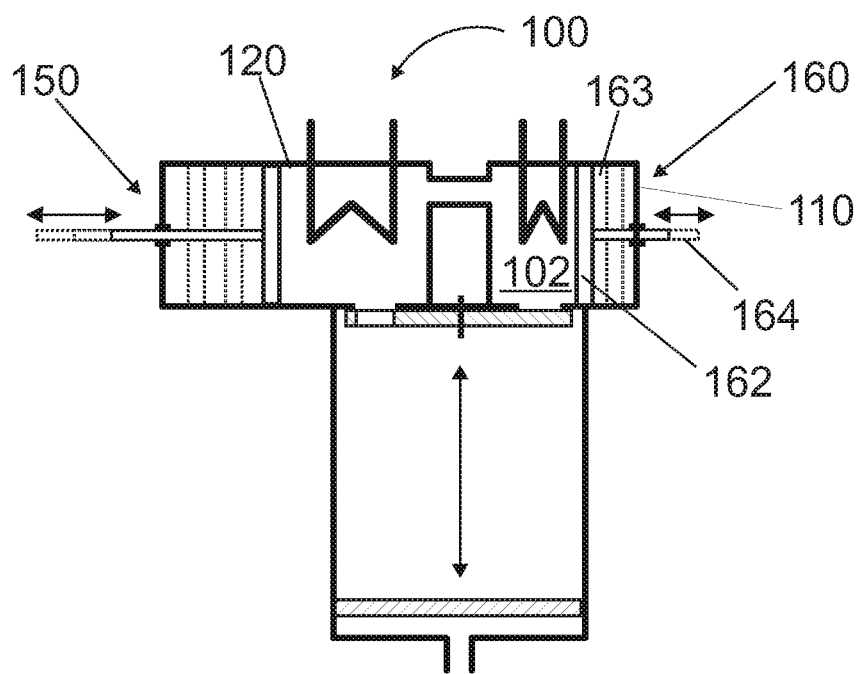
FIG. 3: shows another embodiment of a heat exchanger assembly according to the invention with two heat exchanger compartments of variable size.

FIG. 3 schematically shows another embodiment of a heat exchanger assembly 100 according to the invention. Said figure illustrates how a design providing for differentiated adaptation to temperature differences of the working medium 102 can be implemented by arranging variable control piston assemblies 150, 160 in both heat exchanger compartments 110, 120. The second control piston assembly 160 likewise comprises a control piston 162, a cylinder element 163 and a piston rod 164. Through this, the overall heat exchanger assembly 100 can be adapted to the temperature level of the heat source and the heat sink, so that both heat exchanger compartments 110, 120 can work in an optimal power range.

A particularly advantageous, alternative embodiment provides a circulation line 140 as the one shown in FIGS. 1, 2 and 4 to 8.

Figure 4:
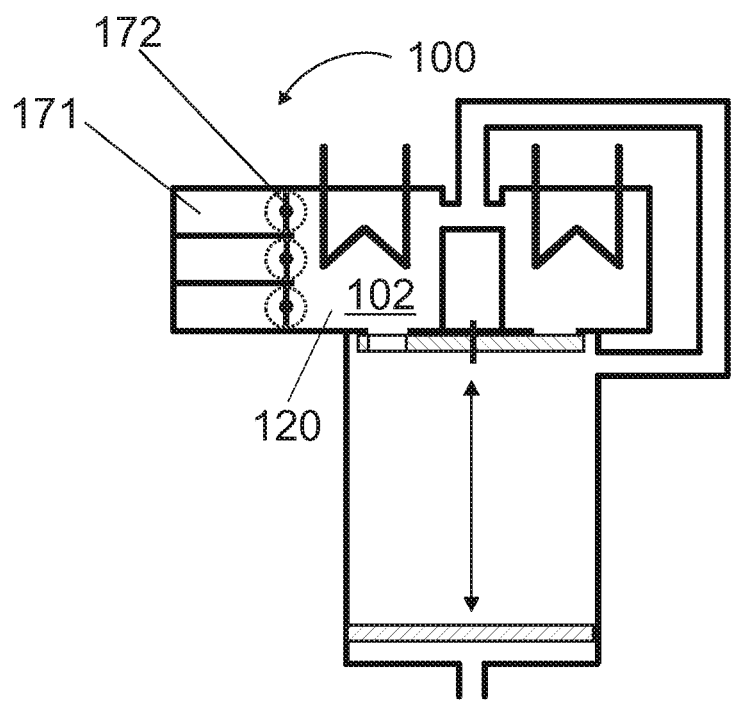
FIG. 4: shows another embodiment of a heat exchanger assembly according to the invention with a heat exchanger compartment that is variable in size through control compartments.

FIG. 4 schematically shows another embodiment of a heat exchanger assembly 100 according to the invention. As can be seen, the volume change of the working medium 102 in one of the heat exchanger compartments, here the high-temperature heat exchanger compartment 120, may also be achieved by selecting multiple small control compartments 171 via control flaps 172 or valves. The more control compartments 171 are selected, the larger the effective volume of the high-temperature heat exchanger compartment 120. This also contributes to achieving optimal working conditions during the heat transfer.

Figure 5:
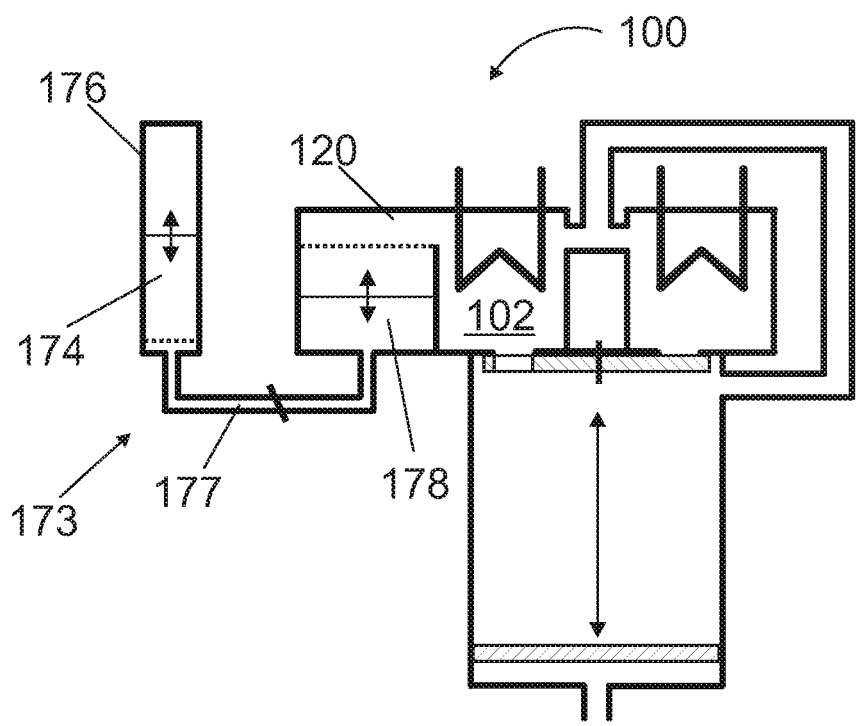
FIG. 5: shows another embodiment of a heat exchanger assembly according to the invention with a heat exchanger compartment that is variable in size through a liquid control system.

FIG. 5 schematically shows another embodiment of a heat exchanger assembly 100 according to the invention. Another type of volume change of the heat exchanger compartments, here the high-temperature heat exchanger compartment 120, is effected through a liquid control system 173 and can be implemented through variable filling of a portion of the high-temperature heat exchanger compartment 120 with a suitable control liquid 174, e.g. thermal oil. A control liquid reservoir 176, which is a storage vessel for the control liquid 174, is connected to the high-temperature heat exchanger compartment 120 via a control line 177 and a valve. A control volume 178, in which the control liquid 174 can collect, is advantageously arranged in the high-temperature heat exchanger compartment 120 so that the volume of the high-temperature heat exchanger compartment 120 that can be utilized by the working medium 102 can be changed.

Figure 6:
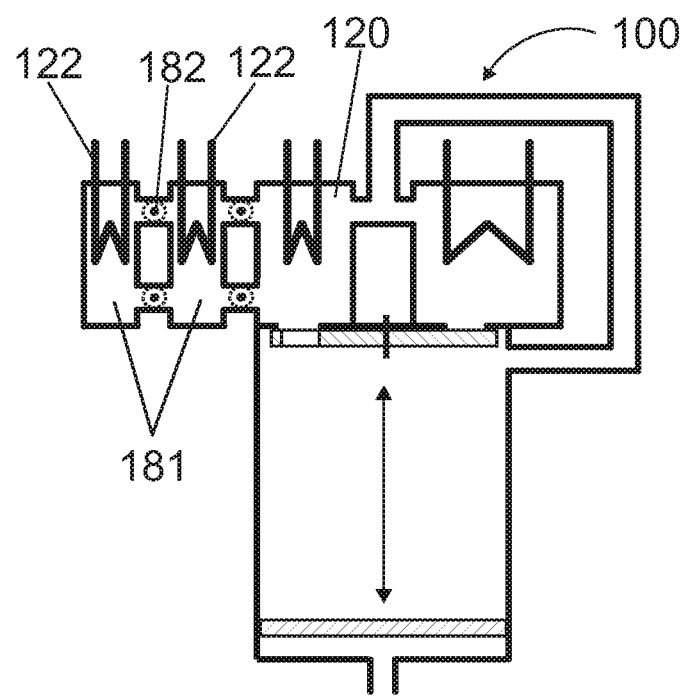
FIG. 6: shows another embodiment of a heat exchanger assembly according to the invention with a modular construction principle.

FIG. 6 schematically shows another embodiment of a heat exchanger assembly 100 according to the invention. According to this figure, the volume adjustment of the high-temperature heat exchanger compartment 120 is effected through a modular construction system which enables flexible coupling of multiple exchangeable and extendable control compartments 181 with the aid of control flaps 182 and/or valves arranged therein. In the illustrated embodiment, each of the control compartments 181 comprises a high-temperature heat exchanger 122, which is preferably designed as a tube-in-tube heat exchanger. Circulation from one control compartment 181 to the next is enabled with the aid of two control flaps 182 which are operable to open and close each of the control compartments 181.

Figure 7:
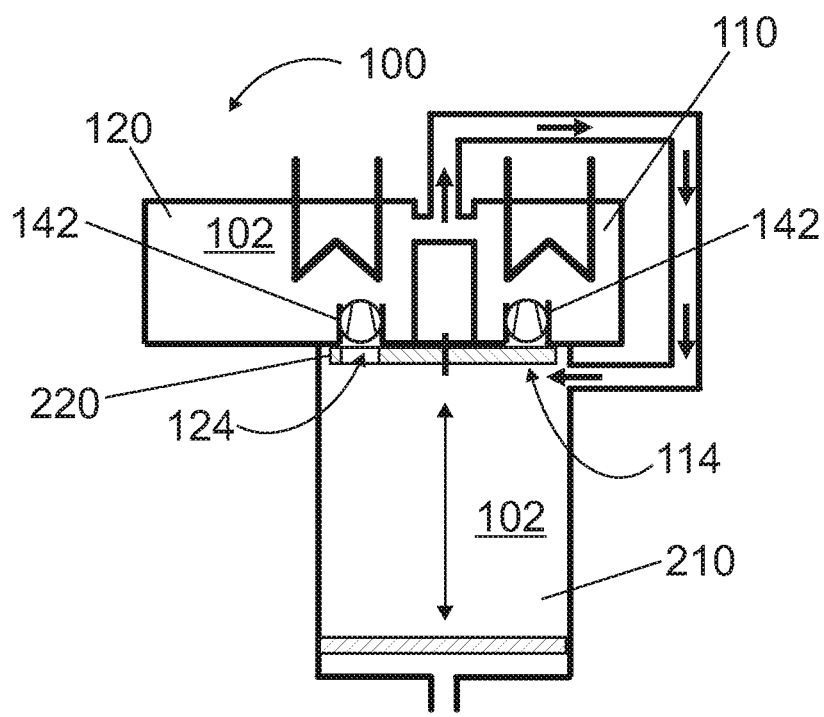
FIG. 7: shows another embodiment of a heat exchanger assembly according to the invention with flow units.

FIG. 7 schematically shows another embodiment of a heat exchanger assembly 100 according to the invention. Flow units 142, e.g. fans, cooperate with at least one of the working medium passage openings 114, 124, so that the exchange of the working medium 102 between one of the heat exchanger compartments 110, 120 and the working chamber 210 can be accelerated. In the illustration, the working medium passage opening 124 is open, whereas the working medium passage opening 114 is closed, or at least shielded so as to hinder flow therethrough, due to the position of the rotary valve 220.

Figure 8:
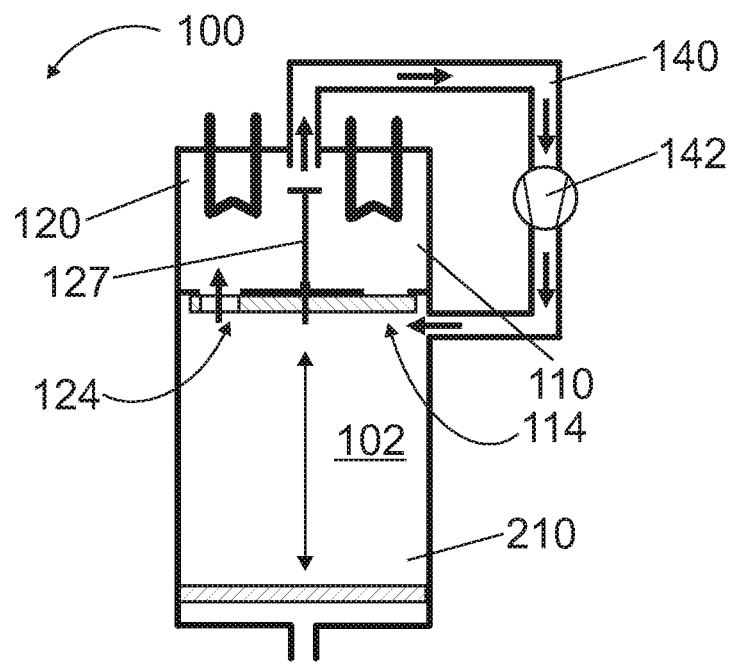
FIG. 8: shows an embodiment of a heat exchanger assembly according to the invention with a flow unit in the circulation line.

FIG. 8 schematically shows another embodiment of a heat exchanger assembly 100 according to the invention, in which a circulation compressor 142 or another flow unit is inserted in the circulation line 140, so that it is not necessary to provide a separate flow unit 142 for each of the working medium passage openings 114, 124. With the aid of the circulation compressor 142, the exchange of the working medium 102 between one of the heat exchanger compartments 110, 120 and the working chamber 210 can be accelerated, so that the duration of the cycle can be shortened.

Moreover, the heat exchanger assembly 100 of the illustrated embodiment is particularly compact. A compartment bridge is dispensed with. Instead, the compartments 110, 120 are separated only by a partition wall 127, wherein a through hole in the partition wall 127 forms the connection between the compartments 110, 120, and the circulation line 140 opens into this region.

Figure 9:
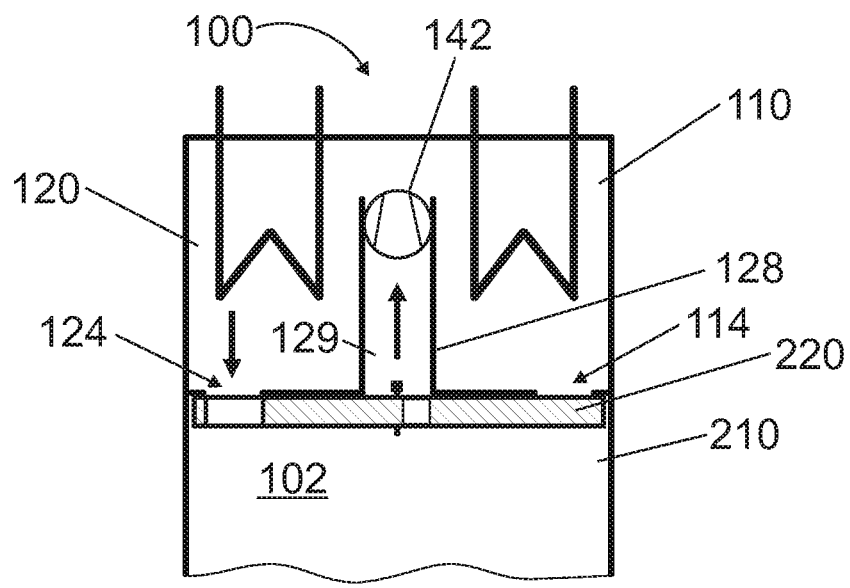
FIG. 9: shows an embodiment of a heat exchanger assembly according to the invention in a compact design.

FIG. 9 schematically shows a cross-sectional illustration of another embodiment of a heat exchanger assembly 100 according to the invention, which is characterized by a particularly compact design and has all elements necessary for an effective circulation housed in its interior. The compartments 110, 120 are separated by a channel partition wall 128, which besides its separation effect also functions as the circulation line. To this end, the channel partition wall 128 accommodates a wall channel 129 through which the working medium 102 can flow so as to circulate from the working chamber 210 to at least one of the heat exchanger compartments 110, 120 and back, wherein the counterflow respectively occurs via at least one of the openings 114, 124 controlled by means of the rotary valve 220 or another closing device.

The flow unit 142, which is also provided according to FIG. 9, is also integrated in the channel partition wall 128, so that the channel partition wall 128 in the preferred embodiment accommodates the circulation compressor as an embodiment of said flow unit 142. Said circulation compressor provides for improved circulation between the compartments, as already discussed above. The flow direction is indicated by arrows.

Figure 10:
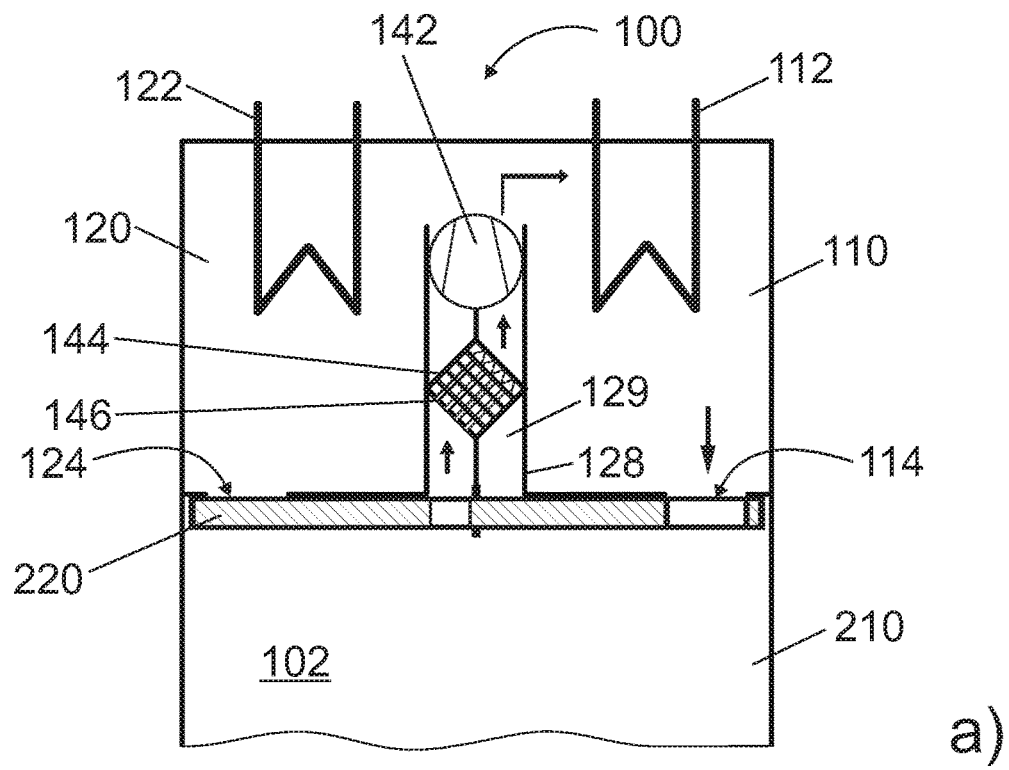
FIG. 10: shows an embodiment of a heat exchanger assembly according to the invention with a regenerator in two operating states.
Figure 10:
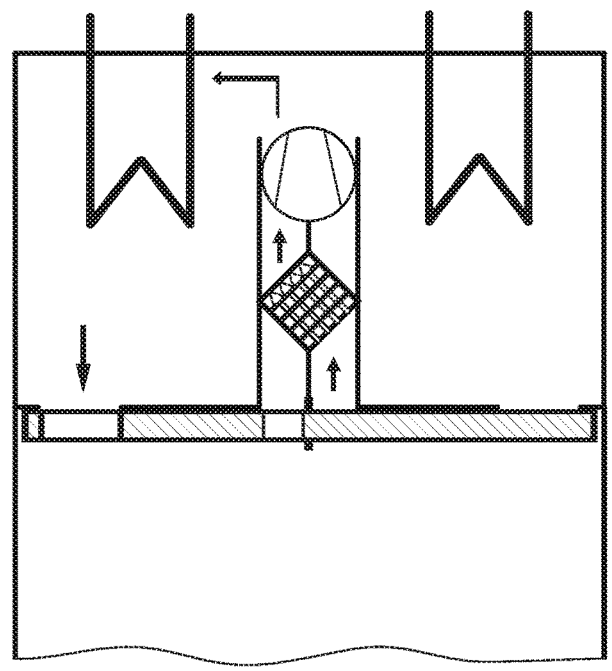

FIG. 10 schematically shows a cross-sectional illustration of another embodiment of a heat exchanger assembly 100 according to the invention, in which all elements necessary for an effective circulation are again housed in its interior. The compartments 110, 120 are separated by a channel partition wall 128, which besides its separation effect also functions as the circulation line. To this end, the channel partition wall 128 accommodates wall channels 129 through which the working medium 102 can flow from the working chamber 210 to at least one of the heat exchanger compartments 110, 120, wherein the counterflow respectively circulates back into the working chamber via at least one of the openings 114, 124 controlled by means of the rotary valve 220 or another closing device.

Moreover, the channel partition wall 128 includes a regenerator 144 which functions as a heat exchanger and can absorb heat from the passing working medium 102 or give off heat to the working medium. This function is enabled or improved by a heat-storing fill mass 146 which is contained in the regenerator 144 in a preferred embodiment thereof. If the working medium 102 is to be cooled, the fill mass 146 absorbs heat, which can then be given off to the working medium 102 when the latter is to be heated. Due to this, the heating and cooling do not need to occur completely through the external heat and cold sources, but instead external energy is saved and thus the efficiency of the energy converter is increased.

The flow unit 142 is also integrated in the channel partition wall 128, so that the channel partition wall 128 in the preferred embodiment accommodates the circulation compressor 142. Said circulation compressor provides for improved circulation between the compartments, as already discussed above.

In the preferred embodiment, the regenerator 144 does not require any moving elements that guide the flow of the working medium 102. Instead, two different flow paths are provided for cooling and heating, which are formed by the wall channels 129 and are selected by means of the provided rotary valve 220. The cooling and heating processes are respectively shown in the illustrations a) and b) of FIG. 11, in which arrows indicate the flow direction. According to illustration a), the hot working medium 102 is guided from the working chamber 210 into the wall channel 129 and over the regenerator 144, where it gives off heat, and in a cooled state flows into the low-temperature heat exchanger compartment 110 for further cooling. According to illustration b), by contrast, cool working fluid 102 flows from the working chamber 210 towards the high-temperature heat exchanger compartment 120. On its way, it is passed along the heated regenerator 144, and the heat-storing fill mass 146 now gives off the previously absorbed heat to the working medium 102. As a consequence, less energy will be needed from the high-temperature heat exchanger 122 to heat the working medium 102.

Figure 11:
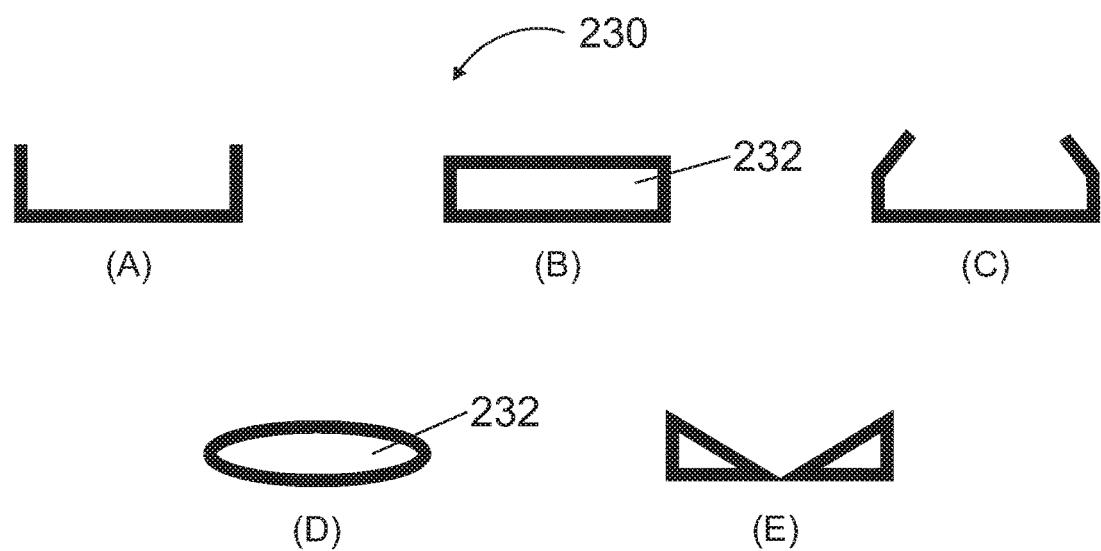
FIG. 11: shows cross-sections of five embodiments of a partition of a thermodynamic energy converter according to the invention.

FIG. 11 schematically shows cross-sections of five embodiments of a partition 230 of a thermodynamic energy converter according to the invention. The freely movable, insulated partition 230, which is illustrated inter alia in FIG. 1 in the working compartment 200 between the working medium 102 and the displacement fluid 202, preferably has little mass and a high stability. With the illustrated shapes A, B, C, D and E, the separation conditions are improved at equal mass, particularly through a better leak tightness towards the inner wall of the working compartment 200.

Shape A has edges folded towards the working chamber, which not only provide for better tightness but also prevent jamming. Shape B has the same advantages as shape A and additionally has a closed inner space. Shape C has the same advantages as shape A and is characterized by improved anti-jamming properties. Shape D has a closed inner space and, due to line contact with the inner jacket surface of the working compartment, combines a reduced susceptibility to getting stuck with good sealing properties. Shape E shows a thickened edge region. At least shapes B and D, but also shape E in its edge region, contain closed spaces for accommodating a thermal insulation material, i.e., an insulator 232.

According to an alternative embodiment, the partition 230 itself may consist of an insulating material, so that the insulator 232 is integral with the partition 230 and actually forms the latter.

Figure 12:
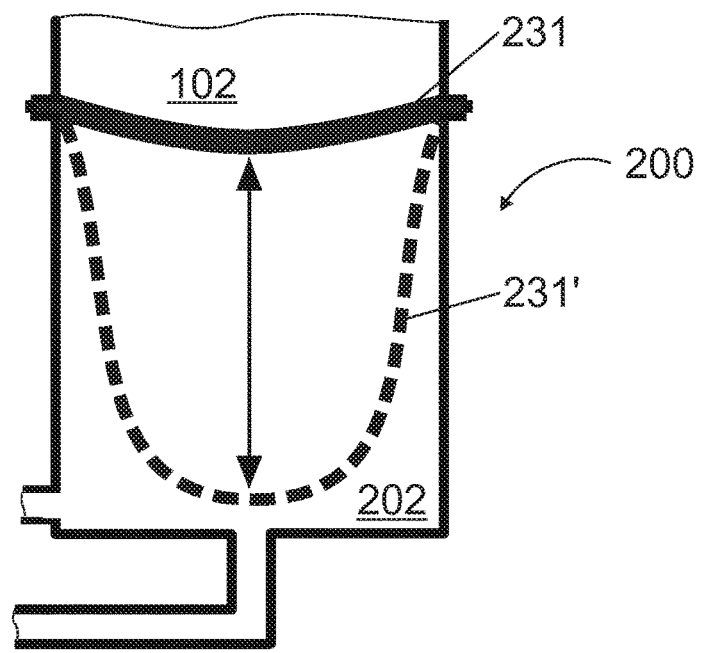
FIG. 12: shows an embodiment of a heat exchanger assembly according to the invention with an elastic partition.

FIG. 12 schematically shows a cross-section of another embodiment of a working compartment 200 of a heat exchanger assembly according to the invention. The thermal insulation between the working medium 102 and the displacement fluid 202 is ensured by an elastic partition 231 that is preferably fixed to the inner edge region of the working compartment 200 in a fluid-tight manner. Depending on the volume of the working medium 102, the elastic partition 231 more or less expands towards the displacement fluid 202 (partition 231' in its deflected position is illustrated as dashed line) and displaces the latter out of the working compartment. In the reverse process, the elastic partition 231 contracts again.

Besides the thermal insulation, the elastic partition 231 can also ensure good tightness, so that chemical interactions and vaporization of displacement fluid 202 into the working medium 102 as well as a dissolution of working medium 102 in the displacement fluid 202 are reliably prevented.

Figure 13:
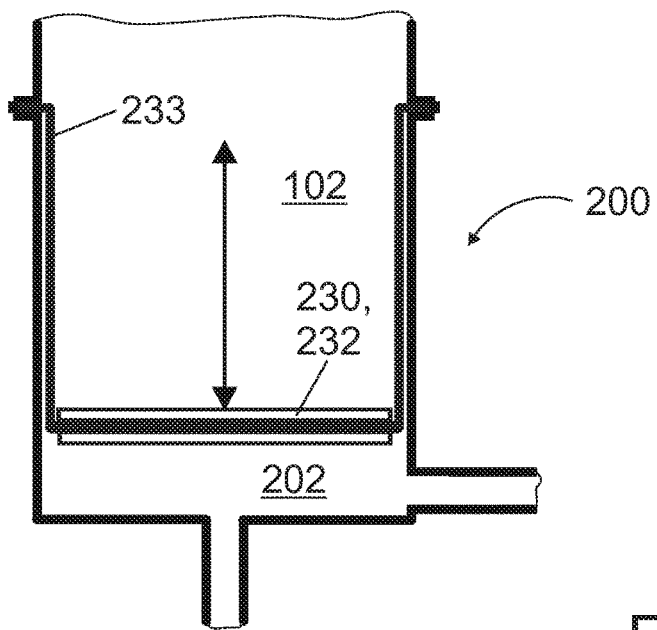
FIG. 13: shows an embodiment of a heat exchanger assembly according to the invention with a membrane and a partition.

FIG. 13 schematically shows a cross-section of another embodiment of a working compartment 200 of a heat exchanger assembly according to the invention, which constitutes a combination of the embodiment with elastic partition 231 (cf. FIG. 12) and the movable partition 230 (cf. FIG. 11) with insulation. Here, an elastic membrane 233 is fixed to the inner edge region of the working compartment 200 in a fluid-tight manner and ensures a good tightness, so that chemical interactions and vaporization of displacement fluid 202 into the working medium 102 as well as a dissolution of working medium 102 in the displacement fluid 202 are reliably prevented. Thermal insulation, on the other hand, is provided by the insulator 232, which includes the partition 230 connected to the membrane 233, wherein the partition does not need to extend as far as to the wall of the working compartment 200. The insulator 232 can therefore move inside the working compartment 200 easily and with low friction. In an alternative embodiment, the insulator 232 is omitted since the elastic membrane 233 itself is designed such that it acts as an insulator.

Figure 14A:
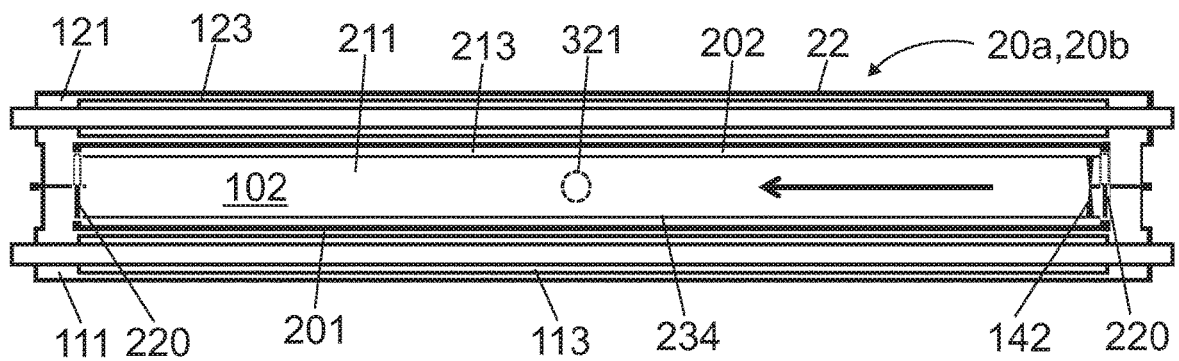
FIGS. 14a and 14b: show longitudinal cross-sections of another embodiment of a tubular balanced-pressure multi-compartment vessel.
Figure 14B:
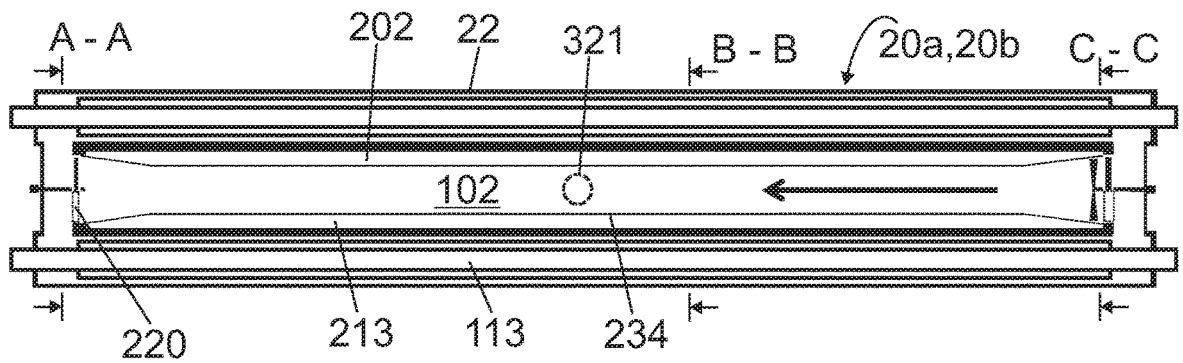

FIGS. 14a and 14b schematically show a longitudinal cross-section of another embodiment of the balanced-pressure multi-compartment vessel 20a, 20b for use in the energy converter according to the invention. The entire arrangement of the components of the balanced-pressure multi-compartment vessel 20a, 20b is essentially concentric, with a cladding tube 22 forming the outer boundary. The high-temperature heat exchanger compartment 121 with the high-temperature heat exchanger 123 and the low-temperature heat exchanger compartment 111 with the low-temperature heat exchanger 113 are respectively formed in an elongate design inside the cladding tube 22. This enables the use of a large heat exchanger surface with small space requirements.

The center of the balanced-pressure multi-compartment vessel 20a, 20b is occupied by the working compartment 201 with the working chamber 211 and the force transmission chamber 213. The working chamber 211 and the force transmission chamber 213 are separated by the separating hose 234. Via the separating hose 234, the pressure of the working medium 102 is transferred to the displacement fluid 202, which can leave or enter the balanced-pressure multi-compartment vessel 20a, 20b via the main line 321.

Control and acceleration of the transport of the working medium 102 over the heat exchangers 113, 123 are achieved by a rotary valve 220 provided on both ends of the tubular working compartment 201 and a fan 142 provided on one end of the working compartment 201. An arrow indicates the passage direction.

If the working medium 102 from the illustration in FIG. 14a cools across the low-temperature heat exchanger 113, its volume decreases in the working chamber 211. As a result, the volume of the force transmission chamber 213 increases and displacement fluid 202 enters via the main line 321, as illustrated in FIG. 14b.

Figure 15A:
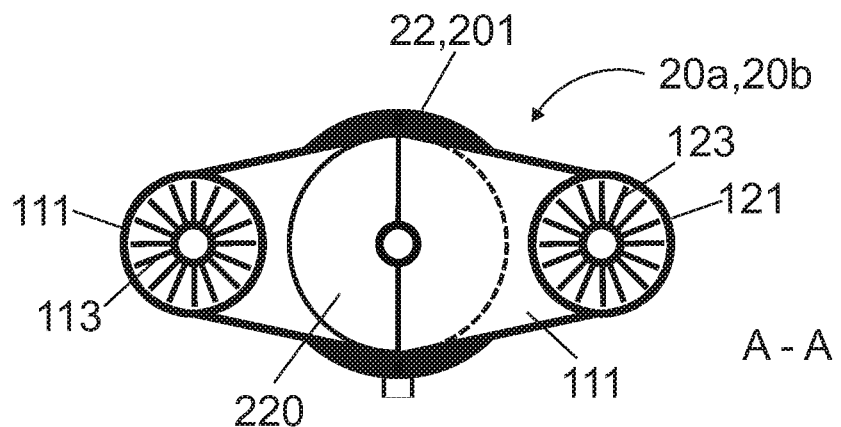
FIGS. 15a to 15c: show cross-sections of another embodiment of the tubular balanced-pressure multi-compartment vessel
Figure 15B:
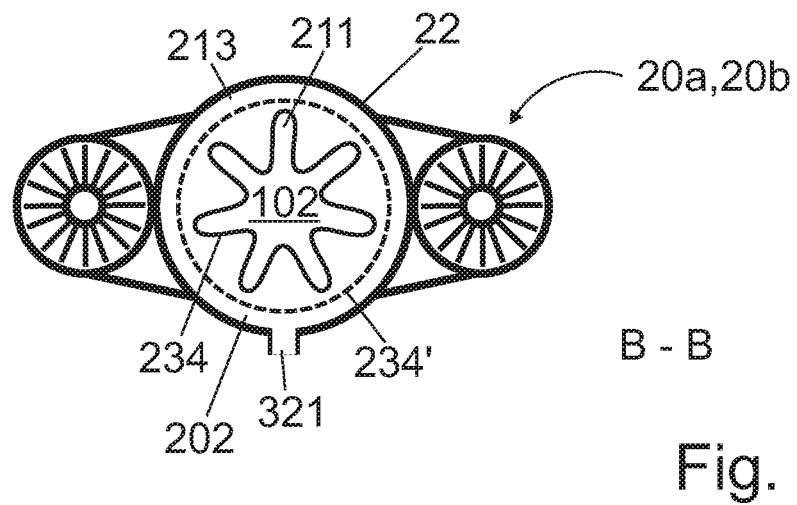
Figure 15C:
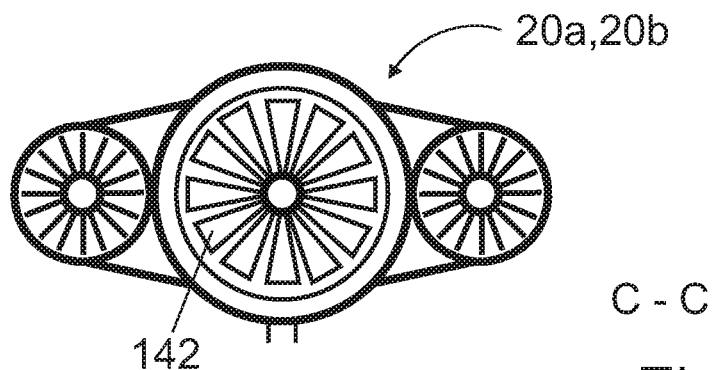

FIGS. 15a to 15c schematically show cross-sectional illustrations of another embodiment of the tubular balanced-pressure multi-compartment vessel 20a, 20b in sectional planes A-A, B-B and C-C indicated in FIG. 14b. In this example, the cylindrical cladding tube 22 houses only the working compartment 201, whereas the high-temperature heat exchanger compartment 121 with the high-temperature heat exchanger 123 and the low-temperature heat exchanger compartment 111 with the low-temperature heat exchanger 113 are attached to the outside of the cladding tube 22. In the cross-section A-A, the rotary valve 220 is shown in open position.

The displacement fluid 202 enters the force transmission chamber 213 via the port for the main line 321, as shown in the sectional plane B-B of FIG. 15b. Said cross-section also shows the separating hose 234 at low pressure of the working medium 102, i.e., small volume of the working chamber 211, whereas the maximum volume of the working chamber 211 and at the same time also the minimum volume of the force transmission chamber 213 are indicated by a dashed illustration of the separating hose 234'. The sectional plane C-C according to FIG. 15c shows the fan 142.

Figure 16A:
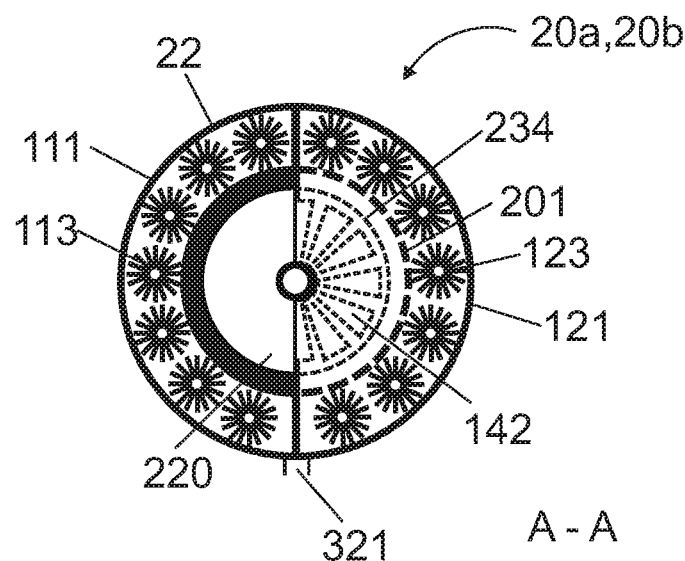
FIGS. 16a and 16b: show cross-sections, as sectional planes A-A and B-B of FIG. 14b, of another embodiment of the tubular balanced-pressure multi-compartment vessel.
Figure 16B:
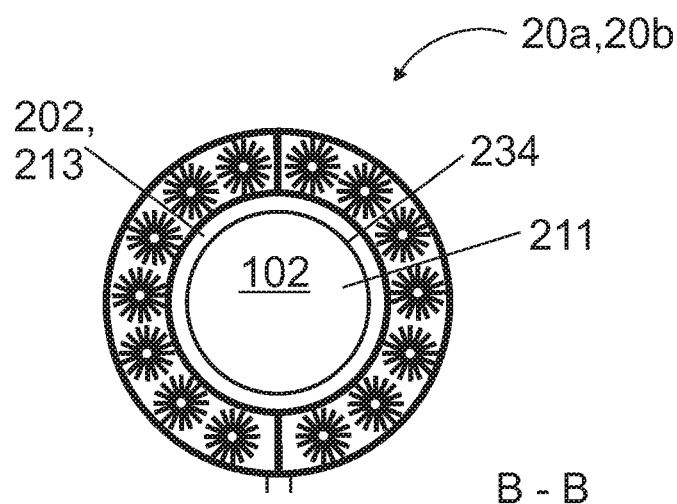

FIGS. 16a and 16b likewise show the sectional planes A-A and B-B of FIG. 14b, however these figures schematically show cross-sectional illustrations of another embodiment of the tubular balanced-pressure multi-compartment vessel 20a, 20b in a completely cylindrical embodiment. The cladding tube 22 therefore encloses not only the working compartment 201 but also the high-temperature heat exchanger compartment 121 with the high-temperature heat exchanger 123 and the low-temperature heat exchanger compartment 111 with the low-temperature heat exchanger 113. Multiple heat exchangers 113, 123 of a smaller diameter are provided, so that these fit into the narrow interspace between the working compartment 201 and the cladding tube 22 and still offer a sufficiently large heat exchanger surface. The cross-section A-A of FIG. 16a also shows the rotary valve 220 and, covered and indicated by dashed lines, the fan 142 and the separating hose 234. The port for the main line 321 is also shown.

The separating hose 234, which has in its interior the working chamber 211 with the working medium 102, can be seen in the cross-section B-B shown in FIG. 16b. The force transmission chamber 213 with the displacement fluid 202 extends outside the separating hose 234.

LIST OF REFERENCE NUMERALS 1 energy converter
10a, 10b balanced-pressure multi-compartment vessel
20a, 20b balanced-pressure multi-compartment vessel
100 heat exchanger assembly
22 cladding tube
102 working medium
110, 111 heat exchanger compartment, low-temperature heat exchanger compartment, (compartment)
112, 113 heat exchanger, low-temperature heat exchanger
114 opening, working medium passage opening
142 flow unit
120, 121 heat exchanger compartment, high-temperature heat exchanger compartment, (compartment)
122, 123 heat exchanger, high-temperature heat exchanger
124 opening, working medium passage opening
127 partition wall
128 channel partition wall
129 wall channel
130 compartment bridge
140 circulation line
142 flow unit, circulation compressor, fan
144 regenerator
146 fill mass
150 control piston assembly
152 control piston
153 cylinder element
154 piston rod
160 control piston assembly
162 control piston
163 cylinder element
164 piston rod
171 control compartment
172 control flap
173 liquid control system
174 control liquid
176 control liquid reservoir
177 control line
178 control volume
181 control compartment
182 control flap
200, 201 working compartment, (compartment)
202 displacement fluid
210, 211 working chamber
212, 213 force transmission chamber
220 closing device, rotary valve
230 partition, movable
231, 231' partition, elastic
232 partition insulator
233 partition, membrane
234, 234' partition, separating hose
240 bypass line
250 valve
300 fluid energy transformer assembly
310 fluid energy transformer
320 valve assembly
321 main line

The invention claimed is:

1. A volume element (10a, 10b, 20a, 20b) for enclosing a working medium (102) inside an inner volume of variable size, including a wall that divides the inner volume into heat exchanger compartments (110, 111, 120, 121) and a working compartment (200, 201), comprising:
    a partition (230, 231, 233, 234) is formed inside the working compartment (200, 201) which divides the working compartment (200, 201) into a working chamber (210, 211) supplied with the working medium (201) and a force transmission chamber (212, 213) supplied with a displacement fluid (202), wherein
    the heat exchanger compartments (110, 111, 120, 121) and the working chamber (210, 211) are fluidly interconnected such that the working medium (102) inside the volume element (10a, 10b, 20a, 20b) has the same pressure, and
    each of the heat exchanger compartments (110, 111, 120, 121) is connected to the working chamber (210, 211) via an inlet, and an outlet that is formed separately from the inlet,
characterized in that the inlet or the outlet is connected between each of the respective heat exchanger compartments (110, 111, 120, 121) and the working chamber (210, 211), and
    at least one device (220) for influencing the flow of working medium (102) through the heat exchanger compartments (110, 111, 120, 121) so as to prevent a flow through at least one of the heat exchanger compartments (110, 111, 120, 121) and to support a flow through at least one other heat exchanger compartment (110, 111, 120, 121).

2. The volume element (10a, 10b, 20a, 20b) according to claim 1, wherein the at least one device (220) is formed of apertures or flaps or as at least one rotary valve.

3. The volume element (10a, 10b, 20a, 20b) according to claim 1, further comprising: at least one device (142) for supporting a passage for circulation of the working medium (102) between the working compartment (210, 211) and the heat exchanger compartment (110, 111, 120, 121), wherein the passage is formed between the heat exchanger compartments (110, 111, 120, 121) and the working chamber (210, 211).

4. The volume element (10a, 10b, 20) according to claim 3, wherein the device (142) is rpm-controlled.

5. The volume element (10a, 10b, 20a, 20b) according to claim 1, further comprising: a regenerator (144) for storing heat is arranged in the inlet of the heat exchanger compartments (110, 111, 120, 121) such that the working medium (102) is charged when entering a first heat exchanger compartment (110, 111) and discharged when entering a second heat exchanger compartment (120, 121).

6. The volume element (10a, 10b, 20a, 20b) according to claim 1, wherein the wall includes an internal thermal insulation.

7. The volume element (10a, 10b) according to claim 1, wherein the partition (230) is fluid-tight and has a buoyancy force that is larger than its weight such that the partition (230) always rests on the surface of the displacement fluid.

8. The volume element (10a, 10b) according to claim 1, wherein the partition (230) includes a thermal insulator or is formed of a thermal insulation material.

9. The volume element (10a, 10b) according to claim 1, wherein the partition (230)
- is a disk that closes the cross-sectional area of the working compartment (200) and that has an edge that is oriented towards the working chamber (210) or
- is a hollow cylinder closing the cross-sectional area of the working compartment (200) or
- is an ellipsoid of revolution closing the cross-sectional area of the working compartment (200).

10. The volume element (10a, 10b) according to claim 6, wherein the thermal insulator of the wall and the partition (230) are formed integrally as a deformable membrane.

11. The volume element (20) according to claim 1, wherein the working compartment (201) is tubular and includes in its interior the force transmission chamber (213) and the working chamber (211), which are arranged coaxially and are separated in cross-section by the partition designed as a separating hose (234), wherein the separating hose (234) is elastic, and
   wherein the heat exchanger compartments (111, 121) are arranged at the circumference of the working compartment (201), and a respective inlet or outlet is provided at the face ends of the working compartment (201) as a connection between the heat exchanger compartments (111, 121) and the working chamber (211), and at least one inlet or outlet includes a device (220) for influencing the flow of working medium (102) through the heat exchanger compartments (111, 121) such that a flow through at least one of the heat exchanger compartments (110, 120) is prevented and a flow through at least one other heat exchanger compartment (110, 120) is supported.

12. The volume element (20) according to claim 11, wherein the heat exchanger compartments (111, 121) are arranged opposite one another on both sides of the working compartment (201).

13. The volume element (20) according to claim 12, wherein each of the heat exchanger compartments (111, 121) forms a shell half that is arranged around the working compartment (201) and has in its interior multiple heat exchangers (113, 123) that are arranged in parallel.

14. The volume element (20) according to claim 11, further comprising a device (142) for supporting the flow is provided on at least one end of the working compartment (201).

15. A device (1) for converting thermal, mechanical and intrinsic energy into one another, including at least two volume elements (10a, 10b, 20a, 20b) according to claim 1 and at least one assembly (300) for transforming kinetic energy of a fluid into mechanical energy, comprising:
   at least one low-temperature heat exchanger (112, 113) for cooling the working medium is arranged inside a first heat exchanger compartment (110, 111) and at least one high-temperature heat exchanger (122, 123) for heating the working medium (102) is arranged inside a second heat exchanger compartment (120, 121) and
   the volume elements (10a, 10b, 20a, 20b) are hydraulically connected via a connection line (321) in regions of the force transmission chambers (212, 213) supplied with the displacement fluid, wherein the assembly (300) for transforming the kinetic energy of the fluid is formed inside the connection line (321).

16. The device (1) according to claim 15, wherein at least one of the heat exchanger compartments (110, 111, 120, 121) is divided into subcompartments, wherein the low-temperature heat exchanger (112, 113) or the high-temperature heat exchanger (122, 123) is accordingly arranged in each subcompartment, and the subcompartments are fluidly interconnected.

17. The device (1) according to claim 16, further comprising a device (220) for preventing a flow or a device (142) for supporting the flow is formed at an opening formed between two subcompartments.

18. The device (1) according to claim 15, wherein at least one of the heat exchanger compartments (110, 111, 120, 121) has a variable inner volume.

19. The device (1) according to claim 15, wherein the heat exchanger compartment (110, 111, 120, 121):
   - is formed of at least two subcompartments that can be closed towards one another, and/or
   - includes a piston that is fluid-tight towards the wall of the heat exchanger compartment (110, 111, 120, 121) and is movable, and/or
   - is filled with a variable-level fluid.

20. The device (1) according to claim 15, wherein the assembly (300) for transforming fluid energy is formed of at least one rotationally acting fluid motor or at least one linear motor.

21. The device (1) according to claim 15, wherein the assembly (300) for transforming fluid energy includes a valve assembly (320).

22. The device (1) according to claim 15, wherein the volume elements (10a, 10b, 20a, 20b) are hydraulically connected via a bypass line (240) in regions of the force transmission chambers (212, 213) supplied with the displacement fluid (202), wherein the bypass line (240) includes a valve (250) for opening and closing the cross-sectional flow area.

23. A method for operating the device (1) according to claim 15, including the following steps:
   a) cooling a gaseous working medium inside a first heat exchanger compartment (110, 111) and heating the gaseous working medium inside a second heat exchanger compartment (120, 121) of each of a first volume element (10a, 20a) and a second volume element (10b, 20b), wherein a respective device (220) for influencing the flow through the heat exchanger compartments (110, 111) is set such that
      the working medium in the first volume element (10a, 20a) is circulated between the second heat exchanger compartment (120, 121) and a working chamber (210, 211) and is heated, which increases the pressure of the working medium at a constant inner volume, and
      the working medium in the second volume element (10b, 20b) is circulated between the first heat exchanger compartment (110, 111) and a working chamber (210, 211) and is cooled, which decreases the pressure of the working medium at a constant inner volume, and
      establishing a pressure difference between the working medium in the first volume element and the working medium in the second volume element,
   b) opening a connection line (321) and connecting force transmission chambers (212, 213) of the volume elements (10a, 10b, 20a, 20b), said force transmission chambers being supplied with a displacement fluid (202), c) expanding the working medium inside the first volume element (10*a*, 20*a*) and compressing the working medium inside the second volume element (10*b*, 20*b*), wherein the displacement fluid (202) flows from the force transmission chamber (212, 213) of the first volume element (10*a*, 20*a*) into the force transmission chamber (212, 213) of the second volume element (10*b*, 20*b*) and an assembly (300) for transforming the fluid energy, which is formed in the connection line (321), is supplied with and driven by the displacement fluid (202) until the working medium in the first volume element and the working medium in the second volume element have the same pressure, d) adjusting the devices (220, 221) for influencing the flow through the heat exchanger compartments (110, 111) such that the working medium in the first volume element (10*a*, 20*a*) is circulated between the first heat exchanger compartment (110, 111) and the working chamber (210, 211) and is cooled, which decreases the pressure of the working medium at a constant inner volume, and the working medium in the second volume element (10*b*) is circulated between the second heat exchanger compartment (120, 121) and the working chamber (210, 211) and is heated, which increases the pressure of the working medium at a constant inner volume, and establishing a pressure difference between the working medium in the first volume element and the working medium in the second volume element, e) opening the connection line (321) and connecting the force transmission chambers (212, 213) of the volume elements (10*a*, 10*b*, 20*a*, 20*b*), said force transmission chambers being supplied with the displacement fluid (102), f) expanding the working medium inside the second volume element (10*b*, 20*b*) and compressing the working medium inside the first volume element (10*a*, 20*a*), wherein the displacement fluid (202) flows from the force transmission chamber (212, 213) of the second volume element (10*b*, 20*b*) into the force transmission chamber (212, 213) of the second volume element (10*b*, 20*b*) and the assembly (300) for transforming the fluid energy, which is formed in the connection line (321), is supplied with and driven by the displacement fluid (202) until the working medium in the first volume element and the working medium in the second volume element have the same pressure.

24. The method according to claim 23, wherein the working medium (102) is cooled by flowing over at least one low-temperature heat exchanger (112, 113) inside the first heat exchanger compartment (110, 111), said low-temperature heat exchanger being supplied with a first heat carrier, and that, in order to be heated, the working medium (102) flows over at least one high-temperature heat exchanger (122, 123) inside the second heat exchanger compartment (120, 121), said high-temperature heat exchanger being supplied with a second heat carrier.

25. The method according to claim 23, wherein the kinetic energy of the displacement fluid (202) is converted into mechanical energy.

26. The method according to claim 23, wherein subsequent to the method steps c) and/or f) the connection line (321) is closed and a bypass line (240) is opened to connect the force transmission chambers (212, 213) of the volume elements (10*a*, 10*b*, 20*a*, 20*b*), which are supplied with the displacement fluid (202), to balance the pressure inside the volume elements (10*a*, 10*b*, 20*a*, 20*b*), the bypass line is closed after the pressure is balanced.

* * * * *